United States Patent [19]

Kaneko et al.

[11] Patent Number: 5,832,114
[45] Date of Patent: Nov. 3, 1998

[54] FACSIMILE APPARATUS FOR RECEIVING AND TRANSMITTING STANDARDIZED VIDEO IMAGES

[75] Inventors: Yoji Kaneko, Yamato; Katsutoshi Hisada, Tokyo, both of Japan

[73] Assignee: Canon Kabushiki Kaisha, Tokyo, Japan

[21] Appl. No.: 263,217

[22] Filed: Jun. 17, 1994

Related U.S. Application Data

[63] Continuation of Ser. No. 106,792, Aug. 16, 1993, abandoned, which is a continuation of Ser. No. 575,629, Aug. 31, 1990, abandoned.

[30] Foreign Application Priority Data

Sep. 4, 1989 [JP] Japan .................................. 1-228626
Sep. 4, 1989 [JP] Japan .................................. 1-228629

[51] Int. Cl.⁶ ...................................................... G06K 9/46
[52] U.S. Cl. .............................................................. 382/191
[58] Field of Search .................................... 348/469, 400, 348/426, 479, 518, 519, 500, 508, 539; 382/41, 175, 176, 282, 290, 291, 292; 358/453, 412, 449, 464

[56] References Cited

U.S. PATENT DOCUMENTS

| | | | |
|---|---|---|---|
| 3,798,358 | 3/1974 | Mayer et al. | 178/5.6 |
| 3,838,444 | 9/1974 | Loughlin et al. | 358/142 |
| 3,927,269 | 12/1975 | Yoshino et al. | 348/24 |
| 3,932,698 | 1/1976 | Yanagimachi et al. | 358/143 |
| 4,135,214 | 1/1979 | Weber | 358/261.1 |
| 4,264,925 | 4/1981 | Freeman et al. | 358/142 |
| 4,402,010 | 8/1983 | Vogelman | 348/409 |
| 4,503,556 | 3/1985 | Scherl et al. | 382/176 |
| 4,554,593 | 11/1985 | Fox et al. | 382/176 |
| 4,589,110 | 5/1986 | Eng et al. | 348/439 |
| 4,614,977 | 9/1986 | Kawahara et al. | 368/260 |
| 4,622,582 | 11/1986 | Yamada | 358/425 |
| 4,688,100 | 8/1987 | Haganuma et al. | 358/261 |
| 4,725,886 | 2/1988 | Galumbeck et al. | 358/146 |
| 4,727,434 | 2/1988 | Kawamura | 358/75 |
| 4,739,402 | 4/1988 | Maeda et al. | 358/142 |
| 4,750,043 | 6/1988 | Hisada et al. | 358/261 |
| 4,774,590 | 9/1988 | Haganuma et al. | 358/280 |
| 4,799,110 | 1/1989 | Hisada et al. | 358/261.3 |
| 4,819,063 | 4/1989 | Sugiura et al. | 358/75 |
| 4,837,634 | 6/1989 | Hisada | 358/261.1 |
| 4,862,268 | 8/1989 | Cambell et al. | 358/142 |
| 4,878,085 | 10/1989 | Suto et al. | 358/261.1 |
| 4,887,224 | 12/1989 | Okano et al. | 358/518 |
| 4,891,633 | 1/1990 | Imazeki et al. | 358/425 |
| 4,896,208 | 1/1990 | Moriya et al. | 358/453 |
| 4,974,097 | 11/1990 | Kaneko et al. | 358/400 |
| 5,008,750 | 4/1991 | Gomikawa | 358/147 |
| 5,086,434 | 2/1992 | Abe et al. | 358/453 |
| 5,128,776 | 7/1992 | Scorse et al. | 382/175 |

FOREIGN PATENT DOCUMENTS

| 2932120 | 2/1981 | Germany. |
| 2047042 | 11/1980 | United Kingdom. |
| 2082014 | 2/1982 | United Kingdom. |

*Primary Examiner*—Jose L. Couso
*Attorney, Agent, or Firm*—Fitzpatrick, Cella, Harper & Scinto

[57] ABSTRACT

A facsimile apparatus receives standardized video signal, and is capable of transmitting an original image signal read by a scanner and a standardized video image signal in a communication and also capable of easily and rapidly transmitting said video image signal together with the facsimile image.

16 Claims, 5 Drawing Sheets

FACSIMILE APPARATUS FOR RECEIVING AND TRANSMITTING STANDARDIZED VIDEO IMAGES

This application is a continuation of application Ser. No. 08/106,792 filed Aug. 16, 1993, now abandoned, which is a continuation of prior application Ser. No. 07/575,629 filed on Aug. 31, 1990, now abandoned.

BACKGROUND OF THE INVENTION

1. Field of the Invention

The present invention relates to a facsimile apparatus for receiving standardized video image and transmitting the same after conversion into a facsimile signal.

2. Related Background Art

There are already proposed various still image transmission apparatus for transmitting the image reproduced from a still video camera, but there has not been proposed an apparatus capable of mixedly transmitting such an image with the image of a facimile original.

Figure 7:
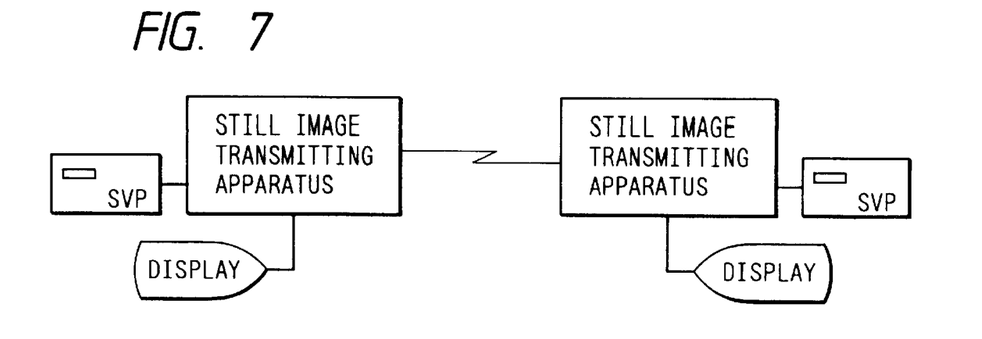
FIG. 7 is a schematic view showing the concept of image transmission in conventional still image transmission apparatus.

FIG. 7 is a schematic view showing the concept of image transmission by a still image transmission apparatus.

This still image transmission apparatus converts an image reproduced from a disk of a still video camera into compressed data according to a predetermined method, and transmits said data to another still image transmission apparatus according to a predetermined procedure. The other apparatus expands the received image and stores it in a disk of a still video camera.

However the communication has only been possible between identical models of the same manufacturer, because the procedure of transmission or method of compression of image information is not unified and also there are various output methods such as television monitors and video printers.

For this reason the still video image and the facsimile image have had to be transmitted separately, with complex operations.

Such a drawback exists not only in the still video but for example also in high definition television systems.

SUMMARY OF THE INVENTION

In consideration of the foregoing, an object of the present invention is to provide a facsimile apparatus capable of resolving the drawbacks mentioned above.

Another object of the present invention is to provide a facsimile apparatus capable of easily and promptly transmitting a standardized video image as well as facsimile image.

Still another object of the present invention is to provide a facsimile apparatus capable of promptly transmitting an image entered from various input devices.

The foregoing objects can be attained, according to a preferred embodiment of the present invention, by a facsimile apparatus designed to receive a standardized video signal, capable of transmitting an original image signal read by a scanner and a standardized video image signal in a communication process and also capable of easily and rapidly transmitting said video image signal together with the facsimile image.

Still another object of the present invention is to provide an apparatus capable of effectively transmitting an image obtained, for example, by a still video camera.

The above-mentioned object can be attained, according to another preferred embodiment of the present invention, by a facsimile apparatus designed to receive a standardized video signal, capable of enlarging the input image frame of said video signal, converting said image into codes corresponding to a facsimile standard, storing said codes in an image memory area, and converting a blank area, appearing between the broadcast standardized image and said image memory area, into a code of white or another single color.

Such apparatus can adapt video images of different sizes or densities into a facsimile transmission image, by reproducing the broadcast-standardized video input image in the image memory area of a facsimile standard, so that standardized video image can be communicated between facsimile apparatus based, for example, on CCITT the standard. In particular the expansion of the video image allows one to obtain an easily observable image, and the conversion of the blank area, appearing when said video image is reproduced in the facsimile image area, into white or another single color enables compression of a high degree of the transmitted image by facsimile encoding, thereby achieving highly efficient transmission.

The foregoing and still other objects of the present invention, and the advantages thereof, will become fully apparent from the following description of the preferred embodiments, to be taken in conjunction with the attached drawings.

DETAILED DESCRIPTION OF THE PREFERRED EMBODIMENTS

Figure 1:
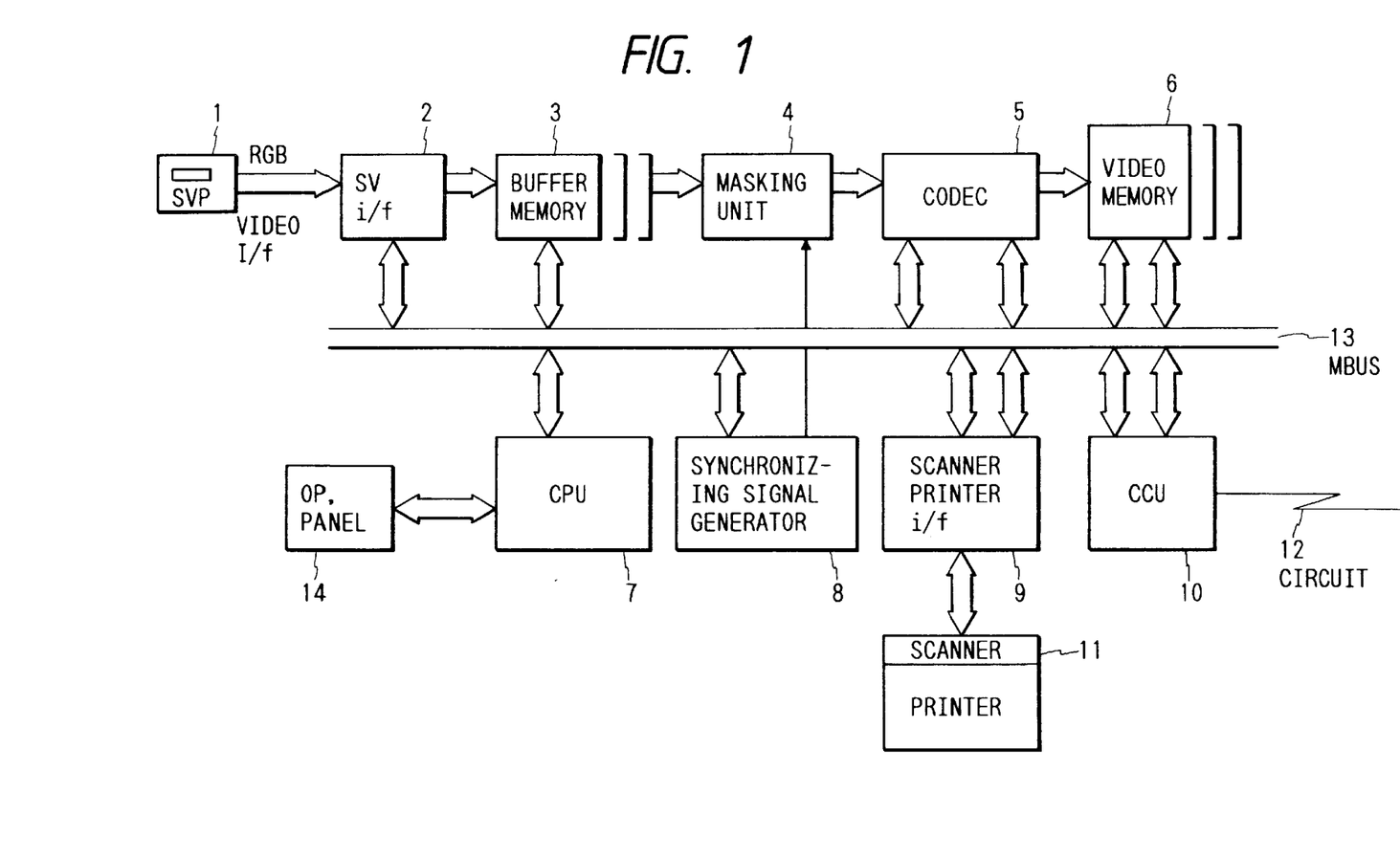
FIG. 1 is a block diagram of a first embodiment of the apparatus of the present invention.

FIG. 1 is a block diagram of an embodiment of the present invention.

A still video player (SVP) 1 reproduces an image; for example, from a floppy disk recorded by a still video camera. A still video interface (SVi/f) 2 effects conversion of a video signal (for example three-color the R, G, B signals) from the still video player 1 into a digital signal and control of said still video player 1.

A buffer memory 3, for temporary storage of the digital video signal from said SVi/f 2, has a capacity of a still video frame, namely 768×480=360 Kbits, for each of R, G and B colors.

A masking unit 4 reproduces the video signal, read from said buffer memory 3, in the image area of a facsimile standard according to the synchronization signals from a synchronization signal generator 8, and effects masking by changing the marginal area of the image into white.

A codec (AD-DA converter) 5 converts the image, reproduced in the facsimile standard by the masking unit 4, into facsimile codes such as MH, MR or MMR.

A video memory 6 stores the video signal converted into facsimile codes, and is provided with memory for three colors R, G and B.

A synchronization signal generator 8 sends synchronization signals to the masking unit 4 and the codec 5 in synchronization with the signal reading from the buffer memory 3.

A scanner/printer interface (SPi/f) 9 functions as an interface for scanner and printer 11. Scanner/printer 11 is composed of a scanner for reading an original image, and a printer for image output on a recording sheet.

A communication control unit (CCU) 10 functions as an interface for a communication line 12, for transmitting the image in the video memory 6.

A CPU 7, equipped with a ROM, a RAM etc., executes various processes according to a program stored in the ROM, and controls the function of the above-explained components, thereby controlling the entire apparatus. A main bus (MBUS) 13 is controlled by the CPU 7.

An operation panel 14, equipped with a keyboard operated by the operator and a display unit, sends various signals to the CPU 7.

Figure 2:
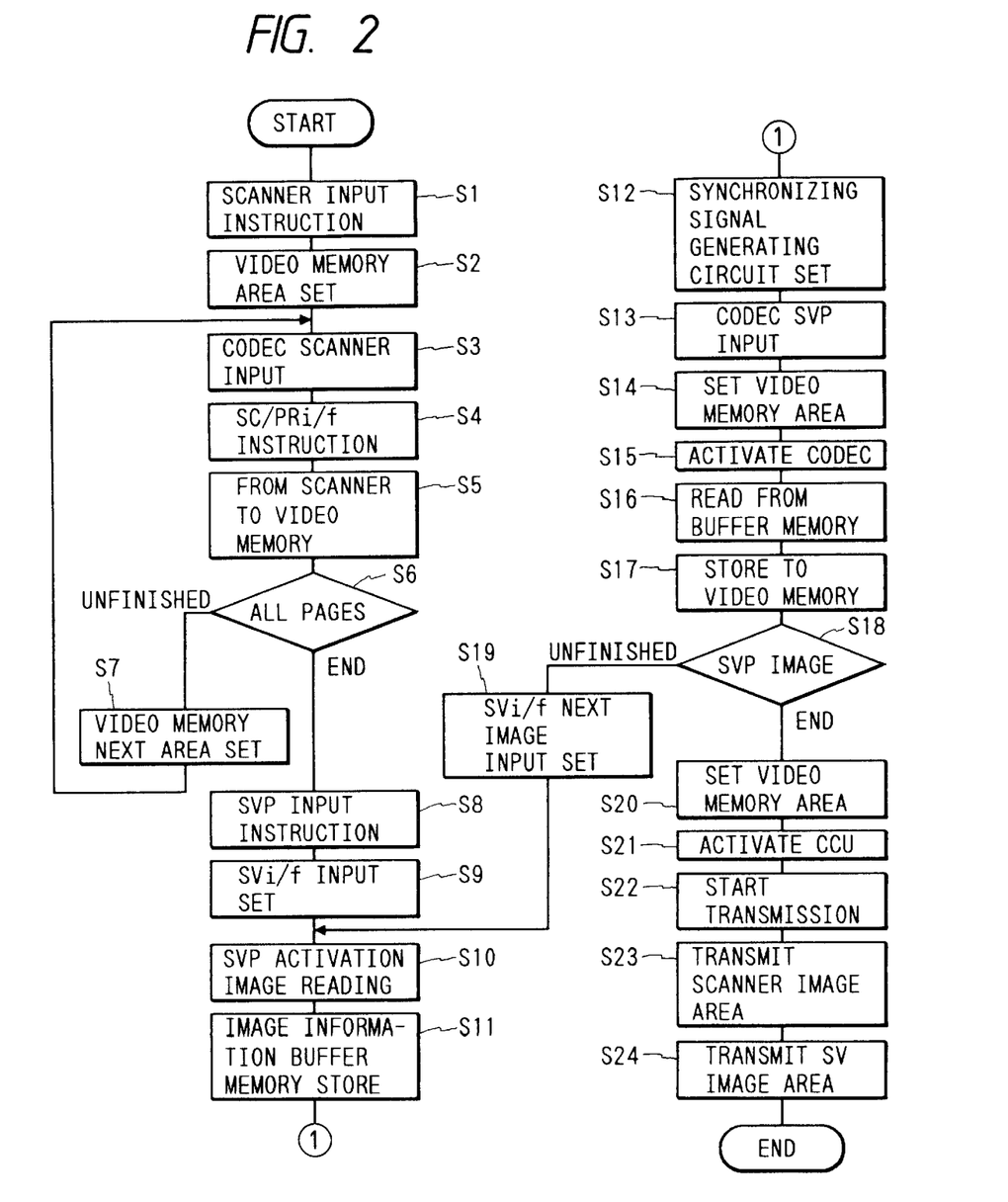
FIG. 2 is a flow chart of the entire control sequence of said embodiment.

FIG. 2 is a flow chart showing the functions of the present embodiment.

At first, the operator enters a scanner input instruction from the operation panel 14 (S1). The CPU 7 sets, in the video memory 6, the address of a transmission area for the scanner image (S2), then sets an input path from the scanner interface 9 in the codec 5 (S3), and sends a reading command to the SPi/f 9 (S4). In response the scanner 11 starts image reading, and the obtained image data are guided through the SPi/f 9, encoded by facsimile codes in the codec 5 and stored in the above-mentioned transmission area of the video memory 6 (S5). Then it is discriminated whether an original to be read is present on the scanner 11 (S6), and, if present, a transmission area for a next page is set in the video memory 6 (S7), and the foregoing procedure is repeated.

When all the pages of the originals are read, the operator enters an input instruction from the still video player 1 (S8). The CPU 7 sets an SVP activating command in the SVi/f 2 (S9). The still video player 1 is activated and reads the image (S10). The image information from the SVi/f 2 is temporarily stored in the buffer memory (S11). Then the synchronization signal generator 8 is set in a predetermined mode (S12). An input path from the SVi/f 2 and the masking unit 4 is set in the codec 5 (S13), then the address of a transmission area for the still video image is set in the video memory 6 (S14), and the codec 5 is activated (S15).

The still video image data are reproduced into an image of a facsimile standard size by means of synchronization signals and masking, then encoded by the codec 5 into facsimile codes, and stored in the transmission area of the video memory 6 (S16, S17). In this case there is conducted mixed storage with image signals obtained from the scanner 11. Then it is discriminated whether another still image of the still video player 1 (S18) is present, and, if present, a command for reading the next image is set in the SVi/f 2 and the above-explained sequence is repeated (S19). If absent, a transmitting operation is initiated.

The CPU 7 sets the transmission area of the video memory 6 at the start address of the image area from the scanner (S20), and activates the CCU 10 in the transmission mode (S21). The CCU 10 starts transmission in the facsimile protocol (S22), reads the image in the unit of a page from the video memory 6 and sends it to the communication line 12 (S23, S24).

As explained in the foregoing, the present embodiment receives the video signal from the still video camera and stores the image data of said still video image and the data of the original obtained from the scanner in the transmission area of the video memory. Thus both data can be transmitted within a communication with reduced cost and time, and there can be achieved communication with another facsimile apparatus of the CCITT standard.

The present invention is not limited to the foregoing process but is applicable to other processes as long as the transmission of data can be achieved within a communication.

Also in the encoding of the still video image, the generation of internal synchronization signals allows the use of the same codec as in image reading with the scanner, whereby the cost of the apparatus can be reduced.

The order of image storage into said video memory may be conducted from the still video to the scanner, opposite to the above-explained embodiment, or in a random order.

Also the still video player and the video interface may be those designed for a single color.

Also the foregoing embodiment is not limited to the processing of a still video image, but it is applicable to an apparatus for sampling moving image data for example by every field. Also the video signal may be of a new standard, for example for high definition television.

As explained in the foregoing, the present embodiment allows transmission of the data of an original obtained from the scanner and the data of a standardized video image within a communication, by storing the input data of the standardized video image in an image memory area of a facsimile standard, thereby enabling easy and rapid transmission of the standardized video image and the facsimile image.

In the following there will be explained a second embodiment of the present invention. The hardware structure of said second embodiment will not be explained as it is identical with that shown in FIG. 1.

Figure 3:
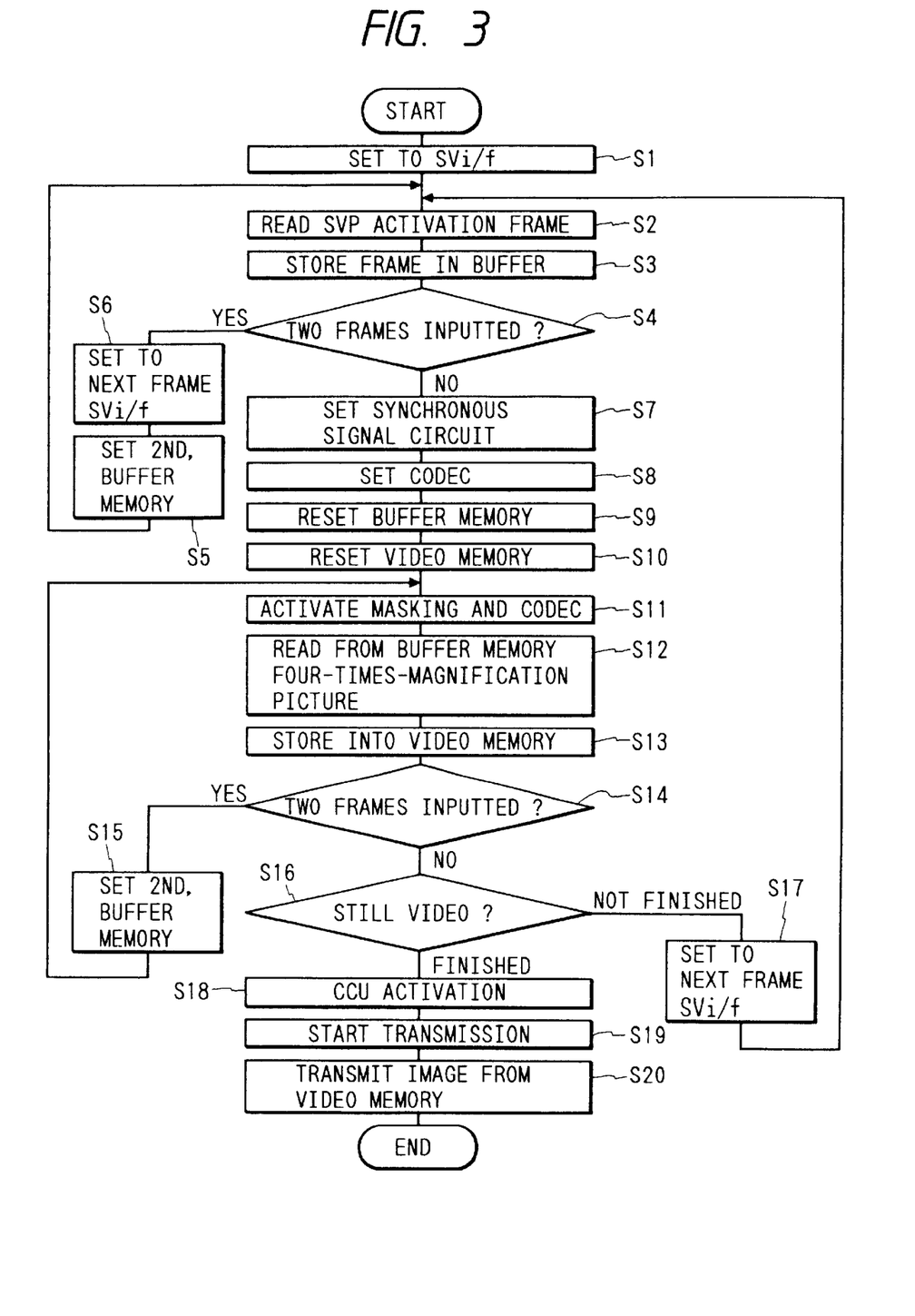
FIG. 3 is a flow chart of the entire control sequence of a second embodiment of the present invention.

Now reference is made to FIG. 3, which is a flow chart of the control sequence of the present embodiment.

This sequence is activated by a program of the CPU 7. When the operator selects the transmission of a still video image by an unrepresented operation panel, there is set a command for activating the still video player 1 in the SVi/f 2 (S1), whereby the still video player 1 is activated and reads a still video image (S2). The image data are subjected to A/D conversion in the SVi/f 2 and stored in the buffer memory 3 (S3).

Then the CPU 7 discriminates whether two images are to be entered (S4), and, if affirmative, sets the buffer memory 3 for the storage of a second image (S5). Then the CPU 7 sends a command for reading the next image in the SVi/f 2 and stores the next image in the second area of the buffer memory 3 (S6).

After the storage of the image, the synchronization signal generator 8 is set at a timing corresponding to the sheet size of a desired facsimile standard (S7), and the codec 5 is set at a predetermined encoding method (S8). Also the address counter of the buffer memory 3 is set at 4 times (S9), whereby the read image is expanded to 4 times. Also the address for a transmission area is set in the video memory 6 (S10).

Subsequently the masking unit 4 and the codec 5 are activated (S11), then the 4-times expanded still video image is read from the buffer memory 3 (S12), and the encoded image data are stored in the video memory 6 (S13). Then, in case of input of two images (S14), the buffer memory 3 is set for the second image (S15), and the sequence returns to the step S11 for repeating the image reading operation.

Then it is discriminated whether the input of video images has been completed (S16), and, if not, a command is set in the SVi/f 2 for the input of the next image (S17), and the sequence returns to the step 2.

If the input of video images has been completed, the transmitting operation is initiated. At first a transmission instructing command is set in the CCU 10 (S18) to initiate the transmission by the CCU 10 (S19), whereby the predetermined number of images stored in the video memory 6 are transmitted through the line 12 (S20). The control sequence is thus completed.

Figure 4:
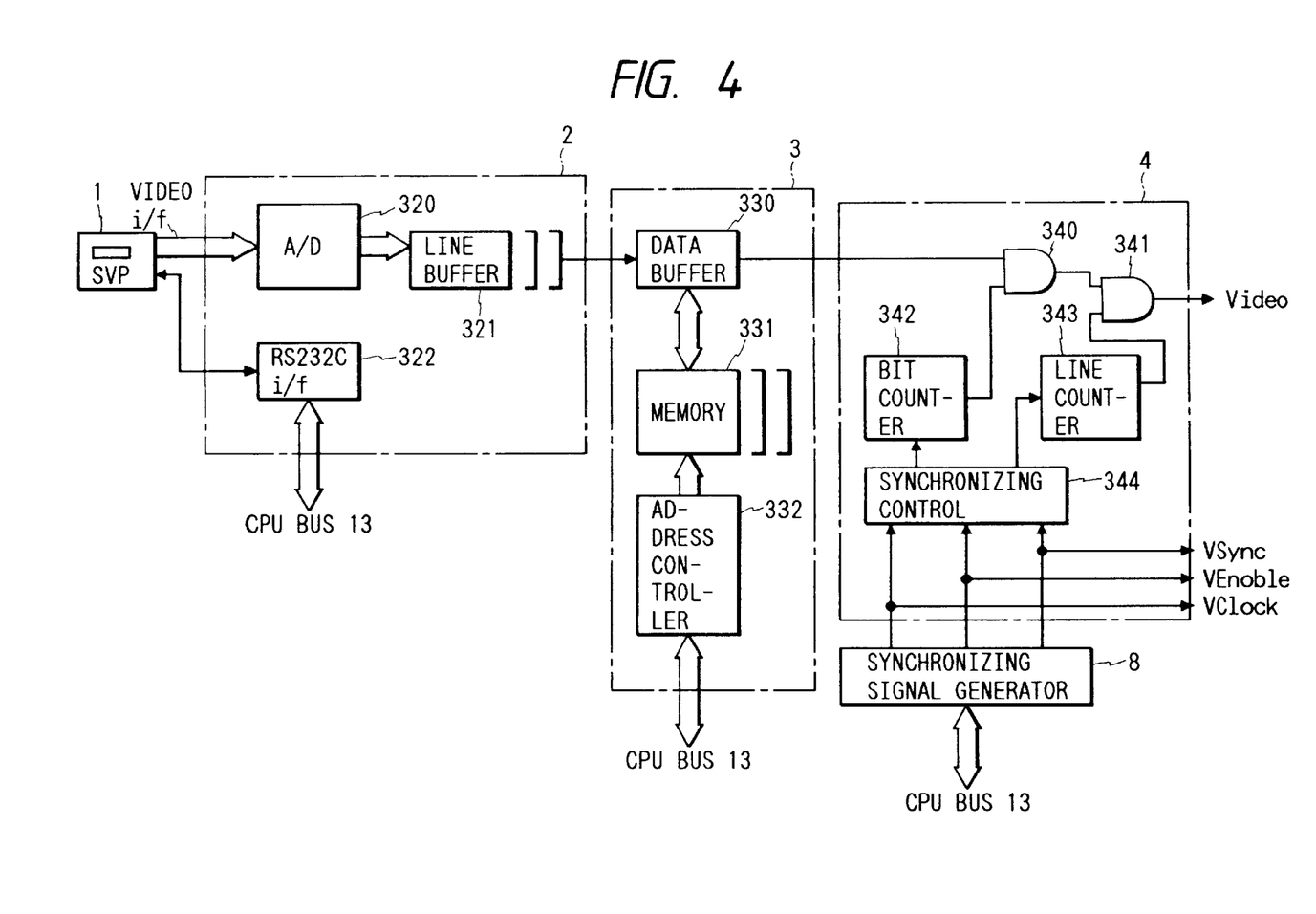
FIG. 4 is a circuit diagram showing the details of the SVi/f, buffer memory and masking unit in said embodiment.

FIG. 4 is a circuit diagram showing the details of the SVi/f 2, buffer memory 3 and masking unit 4 of the present embodiment.

The SVi/f 2 effects exchange of command/status signals through a RS232C interface 322 and the CPU bus 13, and controls the still video player 1 through said interface 322. The still video image reproduced by the still video player is converted, by an A/D converter 320 of the video interface, into digital R, G, B signals, and is subjected to rate matching in a line buffer 321.

In the buffer memory 3, the R, G, B signals from said line buffer 3 are stored, through a data buffer 330, in a memory 331.

The memory 331, of which the address is controlled by an address controller 332, has a capacity of three frames at 768×480=360 Kbits as explained before. The address of said memory 331 is controlled by every 480 lines of 768 bits in each line. Image expansion at the image reading is achieved in the following manner. The image is expanded 4 times in the main scanning direction by stepwise renewing the address at every four synchronization pulses VClock to be explained later, and in the sub scanning direction by stepwise renewing the scanning line at every four synchronization signals VEnable. Said memory 331 is composed of two buffers for buffering two images.

The a masking unit 4 effects masking operation by gates 340, 341 in the main and sub scanning directions, at the reading of the image of a frame stored in the memory 331, thereby rendering the marginal area white or another single color. As an example, in case of A4 size, the gating is applied in an area, in the main scanning direction, exceeding 768× 4=3,072 bits counted by a bit counter 342, and in an area, in the sub scanning direction, by counting from 480×4=1,920th line to the 2,376th line corresponding to one half of the A4 size. The second image in the memory is similarly masked.

Figure 5:
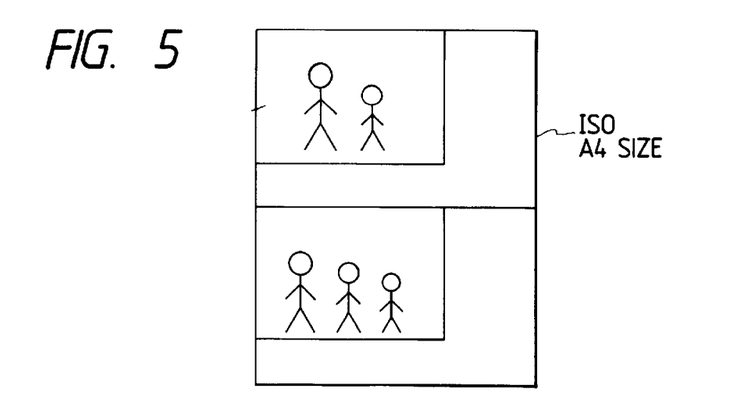
FIG. 5 is a schematic view showing an example of reproduction of a still video image in a facsimile image area in said embodiment.

Thus, as shown in FIG. 5, two still video images expanded 4 times matching the facsimile standard are reproduced in the upper and lower parts in ISO A4 size.

A synchronization controller 344 controls various units according to the synchronization signals (VSync, VEnable, VClock) from said synchronization signal generator 8.

According to the above-explained process, there is obtained a 4-times expanded image (video) signal matching the facsimile standard, which is encoded into facsimile codes together with the above-mentioned synchronization signals by the codec 5.

Figure 6:
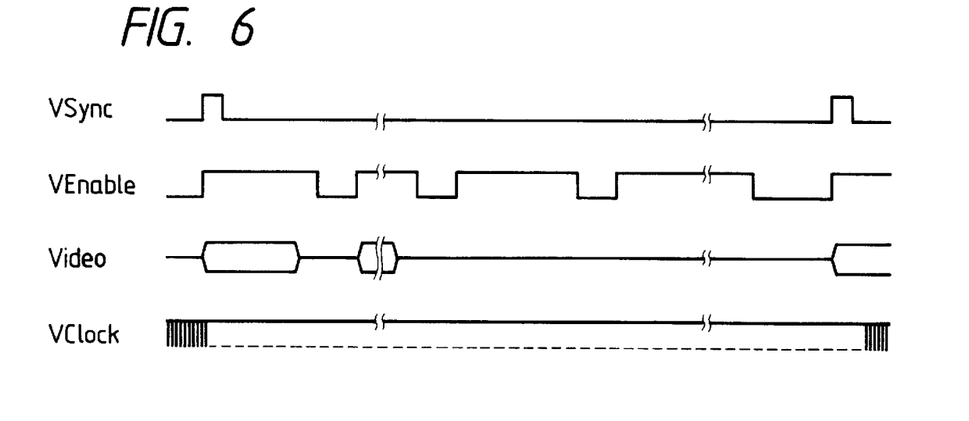
FIG. 6 is a timing chart showing the timing of various synchronization signals in said embodiment.

FIG. 6 is a timing chart showing the timing of said synchronization signals.

The synchronization signal VSync, indicating the range of a page, is generated once for every page.

The synchronization signal VEnable indicates the range of each line, defining the effective width of the video signal, which is 3360 bits 4752 lines in ISO A4 size.

The video signal, which is a still video signal, is partially masked by white or another color in each line and in the middle and rear portions of a page.

The synchronization signal VClock serves as sampling pulses for the video signal.

As explained in the foregoing, the present embodiment enables communication with another facsimile apparatus of the CCITT standard, by receiving the video signal from the still video camera and storing the still video image in a transmission area of the video memory, utilizing masking and synchronization signals.

Also the visibility of the still video image is improved by the expansion of said still video image.

Furthermore, since two still video images can be transmitted as an image, time and cost of transmission can be economized.

Furthermore, the conversion of the marginal area into a white color allows image transmission by highly compressed facsimile codes, thereby economizing time and cost of transmission.

The present invention is not limited by the foregoing embodiments but is subject to various modifications.

For example, the video signal can be a monochromatic signal instead of the B, G, R color signals explained above. In such case, the A/D converter 320, line buffer 321, memory 331 and data buffer 330 mentioned above can be composed of a single circuit.

Also the still video player may be so designed as to reproduce R, G, B signals from a digital record for example on a memory card. In such case the A/D converter 320 mentioned above may be dispensed with.

Also a similar effect can be obtained by converting the marginal area of the image into a single color other than white.

Furthermore, the codec may employ an independent high-compression encoding such as ADCT, instead of the facsimile encoding explained above.

Furthermore, though the foregoing embodiment has been limited to the processing of a still video image, the present invention is likewise applicable to an apparatus for sampling the movable image data for example at every field. The video signal may also be of a new standard, such as of high definition television. These features are valid in common in the foregoing first and second embodiments.

The present embodiment allows the operator to adapt video images of different sizes or densities to image transmission in facsimile by reproducing the broadcast-standardized video input image in an image memory area of the facsimile standard, thereby enabling communication of standardized video image with another facsimile apparatus of the CCITT standard.

Also the expansion of the video image improves the visibility of the image, and the conversion of the marginal area, appearing when said video image is reproduced in the facsimile image area, into white or another single color allows a high level of compression in the facsimile encoding of the transmitted image, thereby achieving highly efficient communication.

We claim:

1. A communication apparatus comprising:

first input means for inputting a standardized video signal standardized in accordance with a first standard;

second input means, different from said first input means, for reading an original image to input an original image signal standardized in accordance with a second standard different from the first standard; and transmission means for transmitting a first image, having at least one page, indicative of the standardized video signal inputted by said first input means and a second image, having at least one page, indicative of the original image signal inputted by said second input means in a transmission process, wherein said transmission means transmits each page of the first image and each page of the second image as separate pages in a single transmission, without time-division multiplexing in units of less than a page.

2. An apparatus according to claim 1, wherein said standardized video signal is adapted to an NTSC standard.

3. An apparatus according to claim 1, wherein said standardized video signal is a color video signal.

4. An apparatus according to claim 1, wherein the original image is a color one, and said second input means inputs a color original image signal.

5. An apparatus according to claim 1, further comprising: a memory into which the video signal and the original image signal from said first input means and said second input means are commonly stored.

6. An apparatus according to claim 1, wherein said transmission means conducts run-length coding of the video signal and of the original image signal.

7. An apparatus according to claim 1, wherein said transmission means changes a magnification power of the video signal to be transmitted.

8. An apparatus according to claim 1, wherein said transmission means conducts transmission through a public circuit.

9. An apparatus according to claim 1, wherein the single transmission includes two frames of the video signal.

10. A communication method comprising the steps of:

inputting, using first input means, a standardized video signal standardized in accordance with a first standard;

reading, using second input means different from said first input means, an original image to input an original image signal standardized in accordance with a second standard different from the first standard; and transmitting a first image, having at least one page, indicative of the standardized video signal inputted by said first input step and a second image, having at least one page, indicative of the original image signal read by said reading step in a transmission process, wherein said transmission step transmits each page of the first image and each page of the second image as separate pages in a single transmission, without time-division multiplexing in units of less than a page.

11. An image communication apparatus comprising:

input means for inputting a plurality of video images standardized by a first standard, each video image being for a respective image plane and having a respective aspect ratio;

varying means for varying the video image for each plane without varying the respective aspect ratio to provide respective varied video images;

generating means for generating a generated image for a single image plane having a size adapted to a second standard incorporating the varied video images and a single color space image; and transmission means for transmitting image data representing the generated image by a communication method based on the second standard.

12. An apparatus according to claim 11, wherein the first standard is a broadcast standard.

13. An apparatus according to claim 11, wherein the first standard is a standard for facsimile communication.

14. An apparatus according to claim 11, further comprising coding means for run-length coding the image data prior to transmission.

15. An apparatus according to claim 11, wherein said varying means enlarges each video image in each of a main scanning direction and a subscanning direction by a factor of four.

16. An image communication method comprising:

inputting a plurality of video images standardized by a first standard, each video image being for a respective image plane and having a respective aspect ratio;

varying the video image for each plane without varying the respective aspect ratio to provide respective varied video images;

generating a generated image for a single image plane having a size adapted to a second standard incorporating the varied video images and a single color space image; and transmitting image data representing the generated image by a communication method based on the second standard.

* * * * *

UNITED STATES PATENT AND TRADEMARK OFFICE
CERTIFICATE OF CORRECTION

PATENT NO. : 5,832,114
DATED : November 3, 1998
INVENTOR(S) : YOJI KANEKO ET AL.

It is certified that error appears in the above-identified patent and that said Letters Patent is hereby corrected as shown below:

ON THE COVER PAGE, at [56], REFERENCES CITED

"4,878,085 10/1989 Suto et al." should read
--4,787,085 11/1989 Suto et al.--.

COLUMN 1

Line 49, "facsimile" should read --a facsimile--.

COLUMN 2

Line 13, "CCITT" should read --the CCITT--.
Line 54, "control" should read --effects control--.

Signed and Sealed this

Twenty-seventh Day of July, 1999

Attest:

Q. TODD DICKINSON

*Attesting Officer*     *Acting Commissioner of Patents and Trademarks*